United States Patent [19]
Yap

[11] Patent Number: 6,102,647
[45] Date of Patent: Aug. 15, 2000

[54] CART FOR TRANSFERRING OBJECTS

[75] Inventor: Hoon-Yeng Yap, Tempe, Ariz.

[73] Assignee: Intel Corporation, Santa Clara, Calif.

[21] Appl. No.: 09/105,191

[22] Filed: Jun. 26, 1998

[51] Int. Cl.[7] .................................................. B65G 47/90
[52] U.S. Cl. ......................... 414/539; 414/467; 414/495; 414/940
[58] Field of Search ..................... 414/539–541, 414/546, 679, 467, 495, 498, 501, 507, 940, 331.04, 331.11, 331.14

[56] References Cited

U.S. PATENT DOCUMENTS

| | | | |
|---|---|---|---|
| 3,110,390 | 11/1963 | Marvin ...................................... | 414/679 |
| 3,190,473 | 6/1965 | Loef ......................................... | 414/541 |
| 3,342,353 | 9/1967 | Davis ....................................... | 414/498 |
| 4,698,775 | 10/1987 | Koch et al. .............................. | 414/940 |
| 4,886,412 | 12/1989 | Wooding et al. ........................ | 414/940 |
| 5,431,600 | 7/1995 | Murata et al. ........................... | 414/940 |
| 5,622,470 | 4/1997 | Schaefer et al. .................... | 414/331.11 |

FOREIGN PATENT DOCUMENTS

| | | | |
|---|---|---|---|
| 6-244272 | 9/1994 | Japan ...................................... | 414/940 |
| 2274440 | 7/1994 | United Kingdom .................... | 414/679 |

*Primary Examiner*—Dean J. Kramer
*Attorney, Agent, or Firm*—Blakely, Sokoloff, Taylor & Zafman LLP

[57] ABSTRACT

A cart for transporting objects includes a wheeled support structure, a carousel and at least first and second object supports. The carousel is rotatably mounted to the support structure. The object supports are mounted to the carousel. The respective object supports are located so as each to support a separate respective object at a separate respective location on a revolution of a carousel.

17 Claims, 12 Drawing Sheets

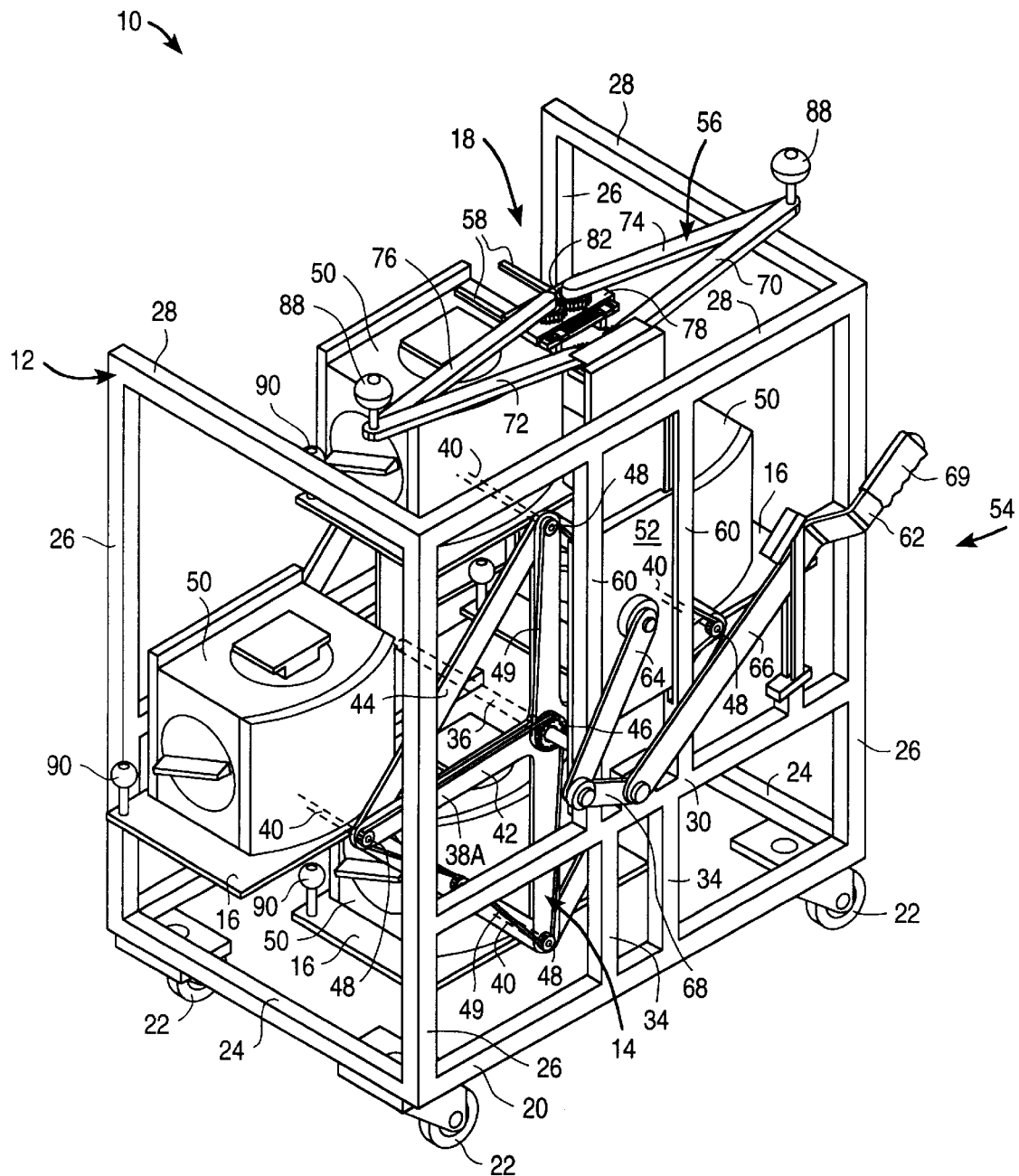
FIG_1

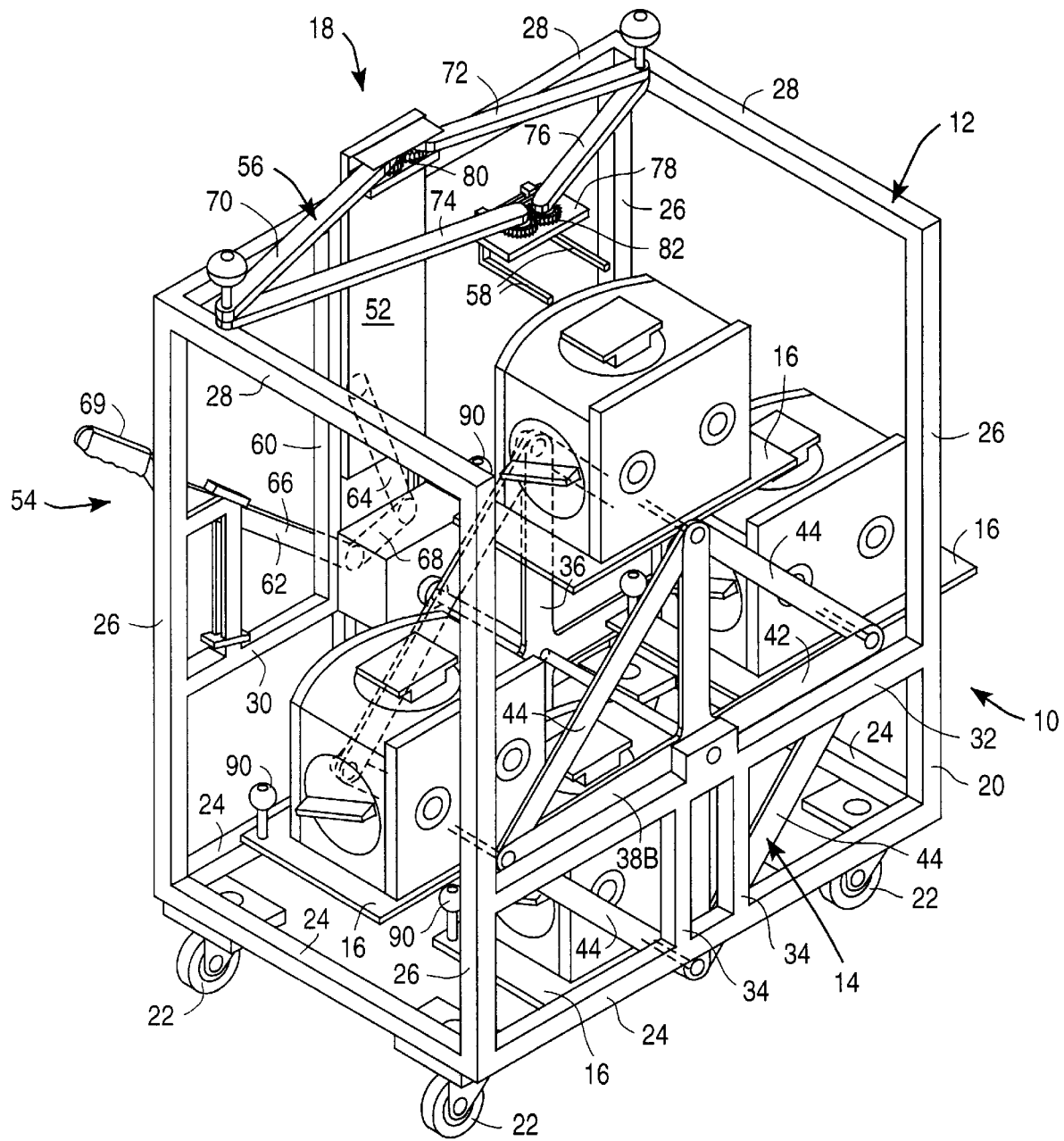
FIG_2

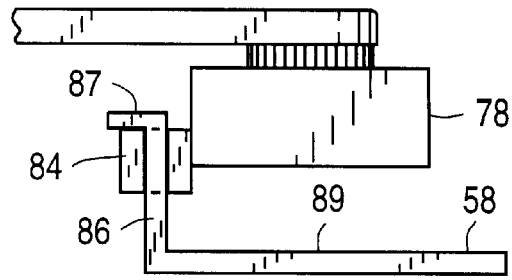
FIG_3
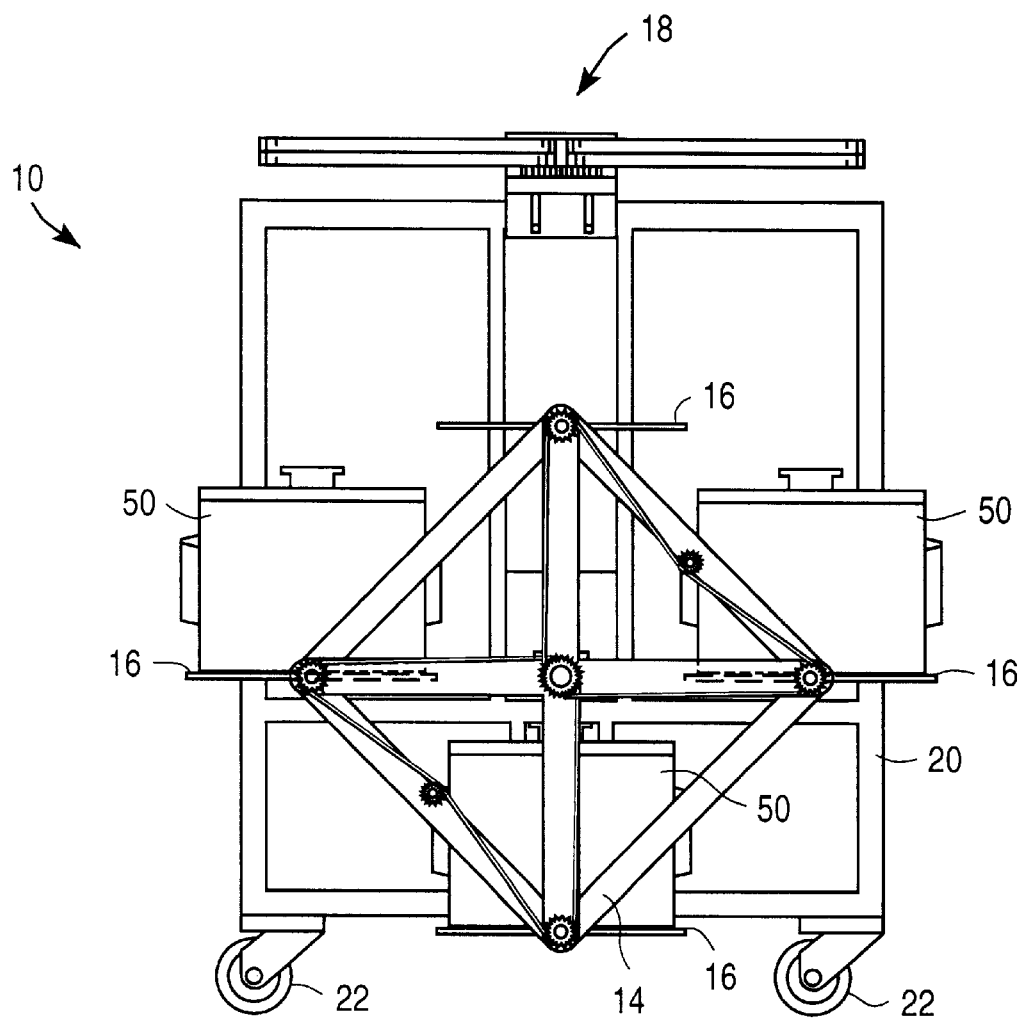
FIG_4

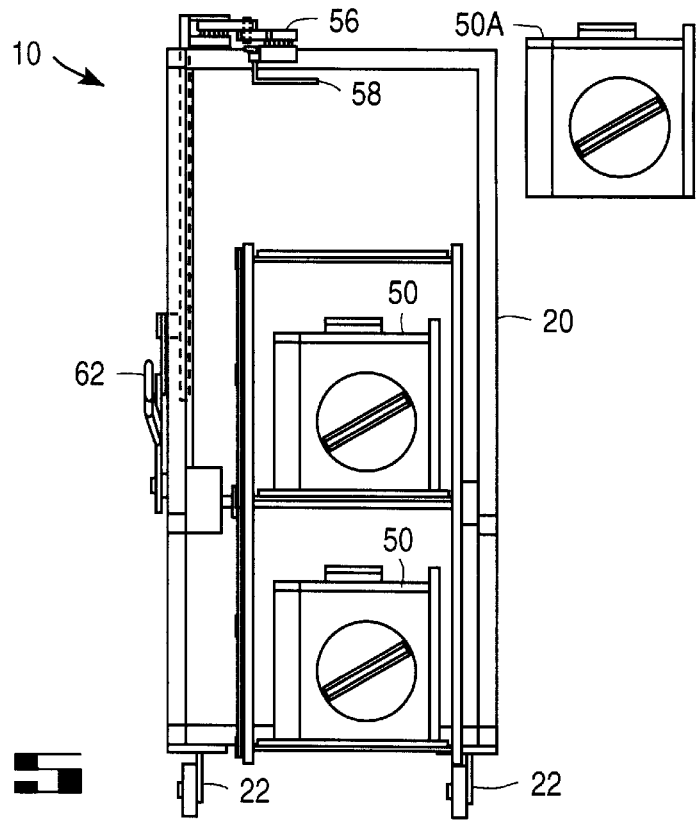
FIG_5
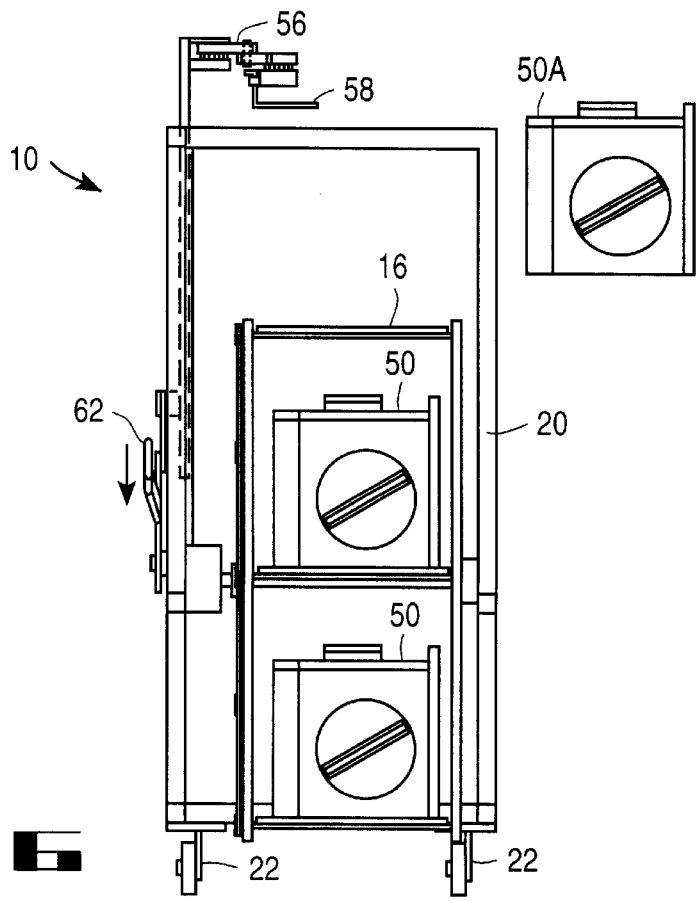
FIG_6

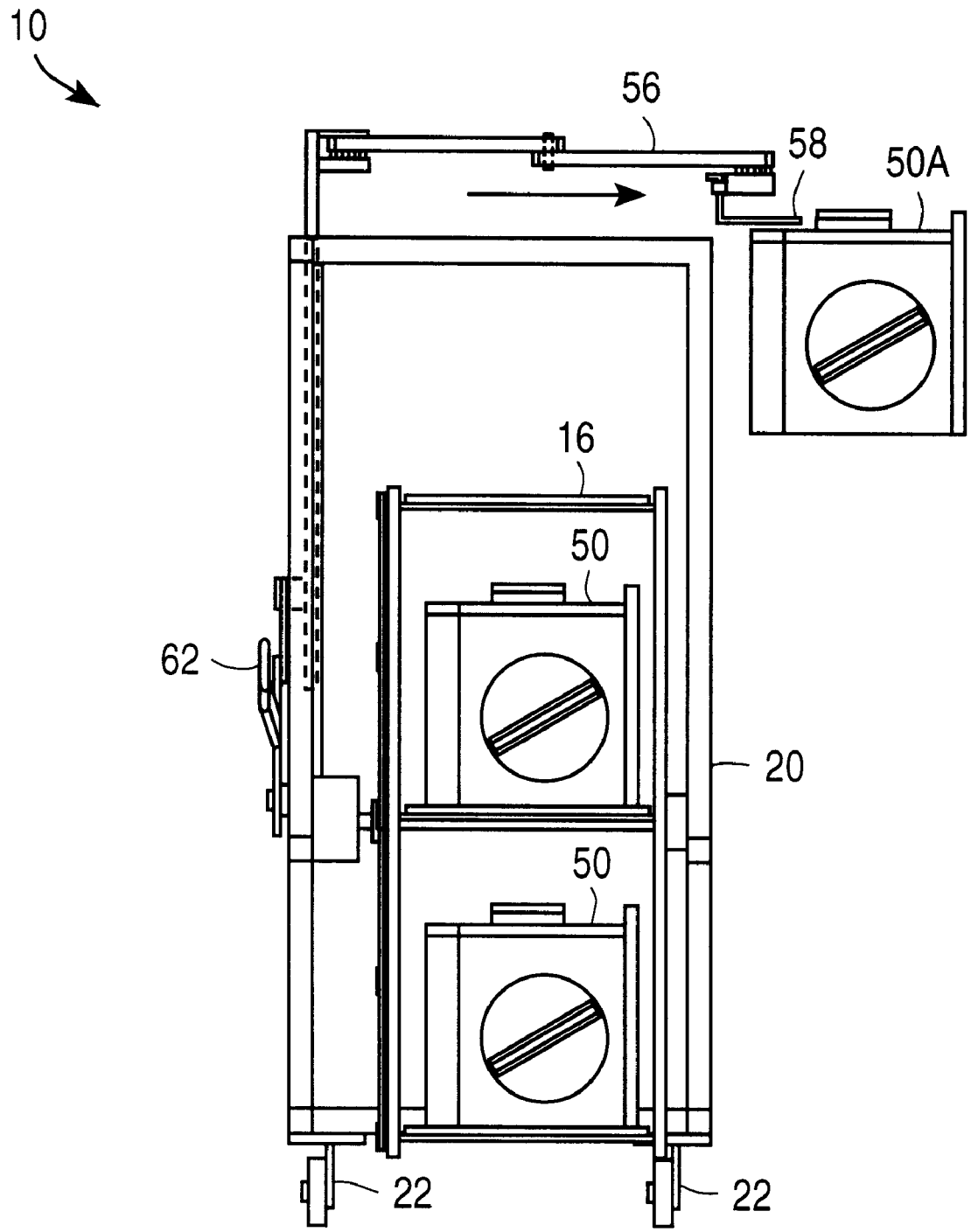
FIG_7

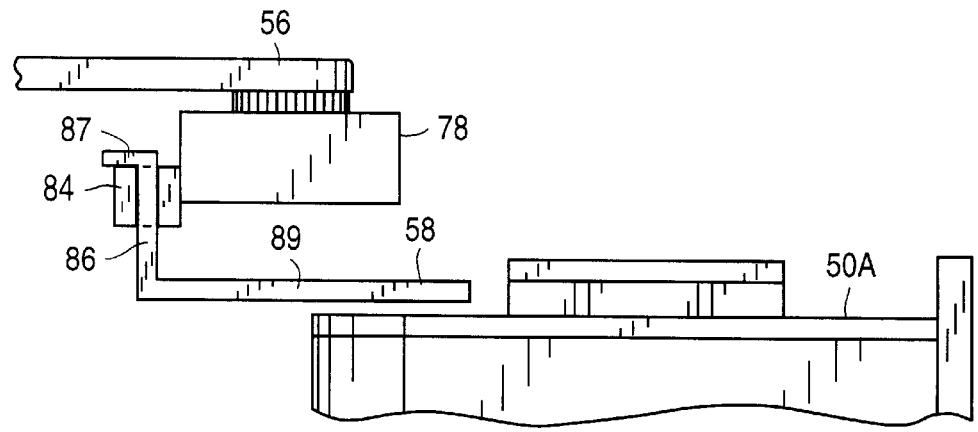
FIG_8
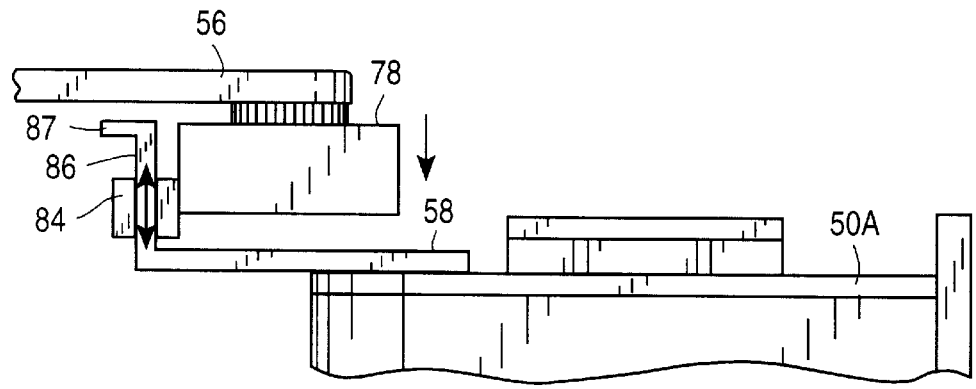
FIG_9
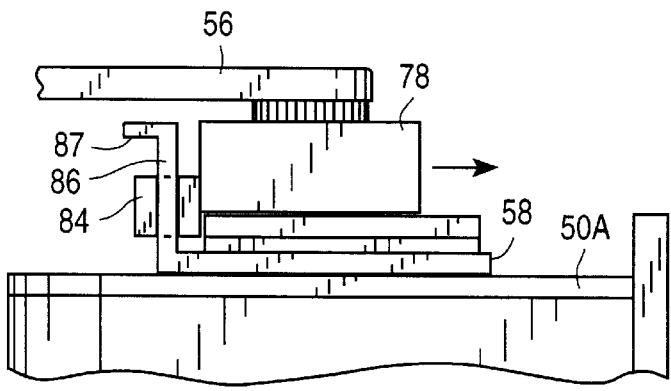
FIG_10

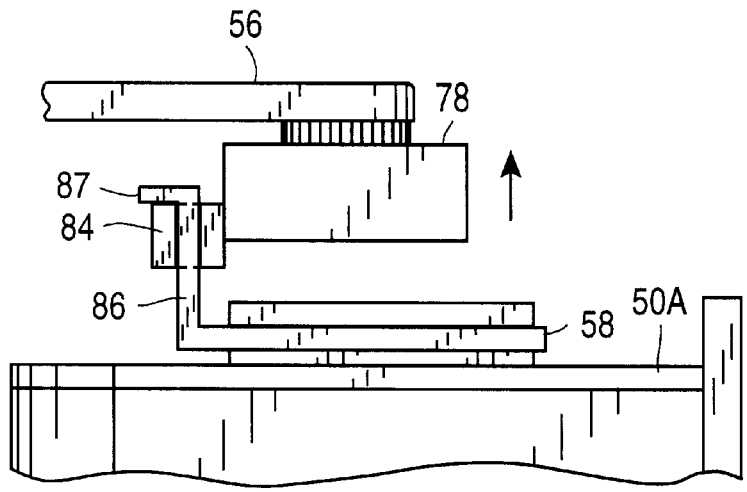
FIG_11
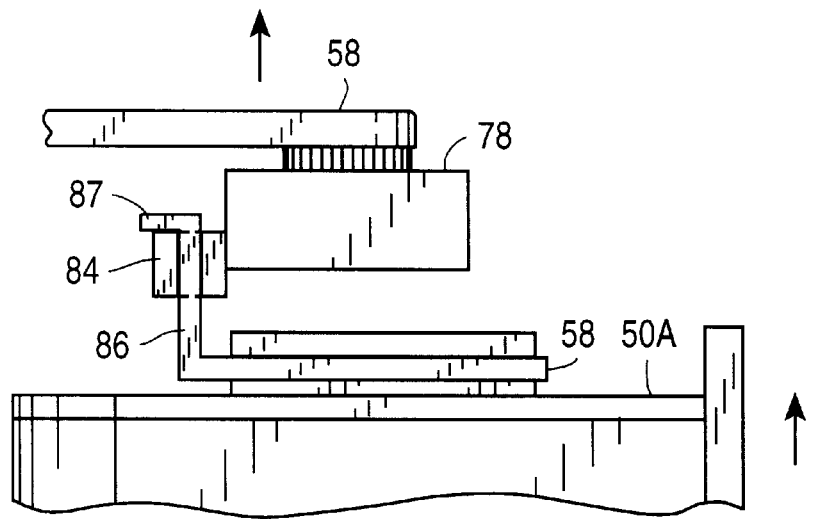
FIG_12

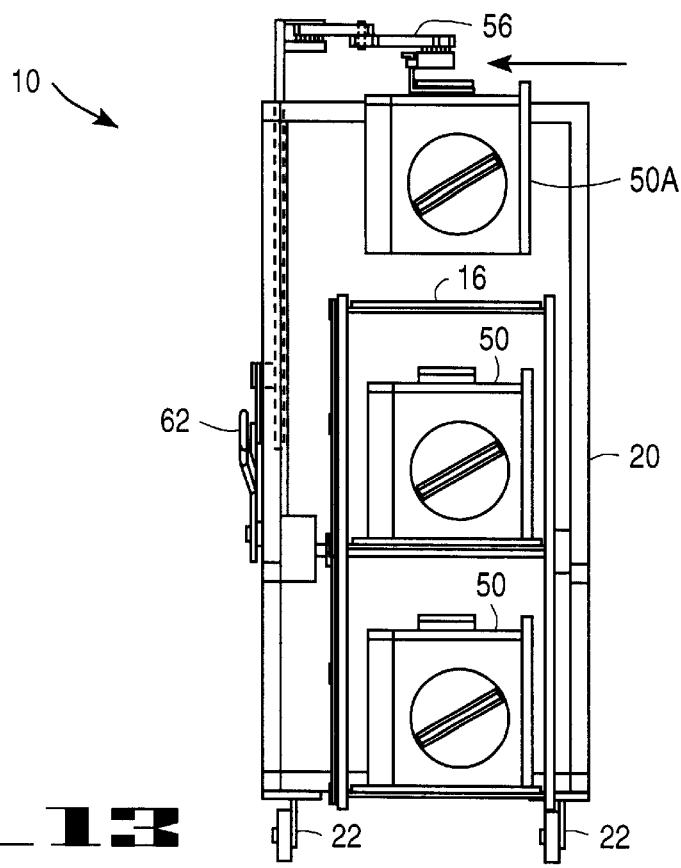
FIG_13
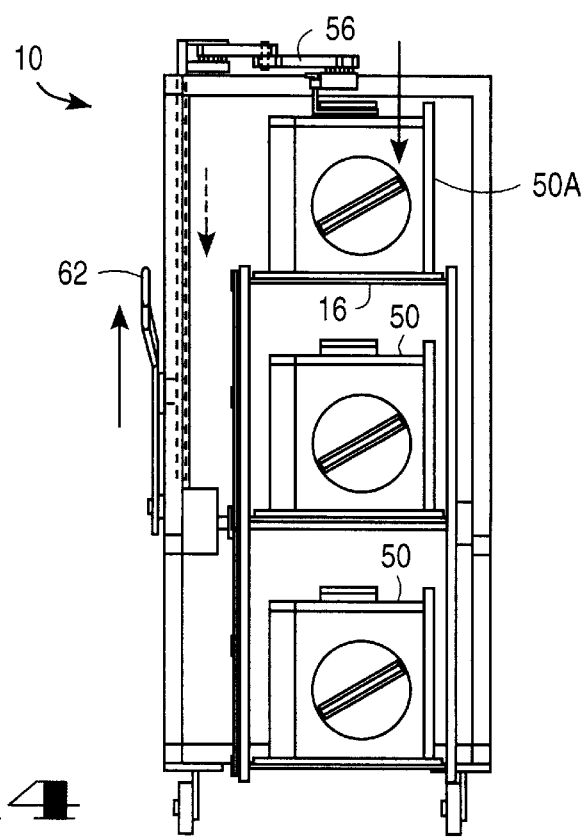
FIG_14

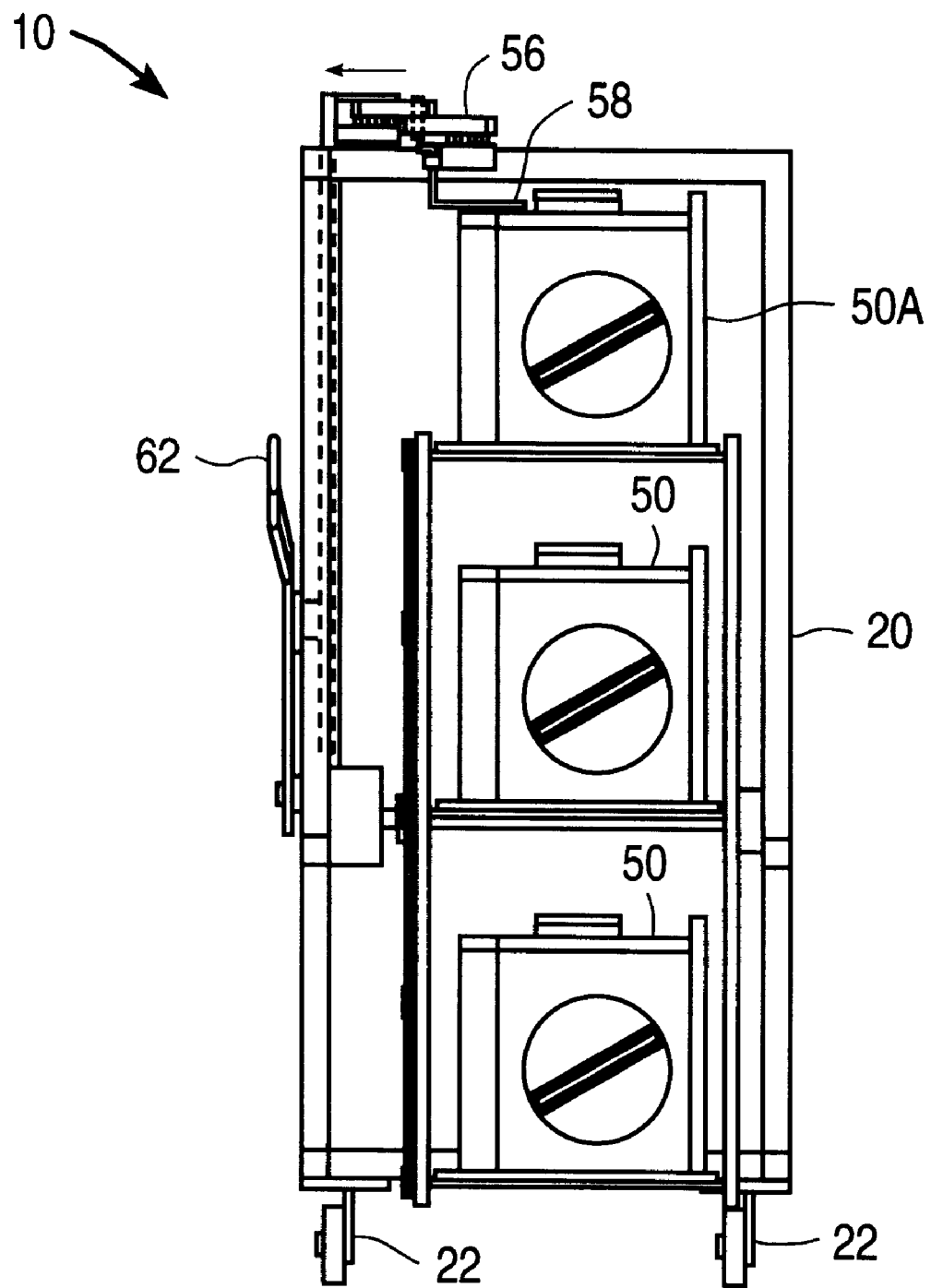
FIG_15

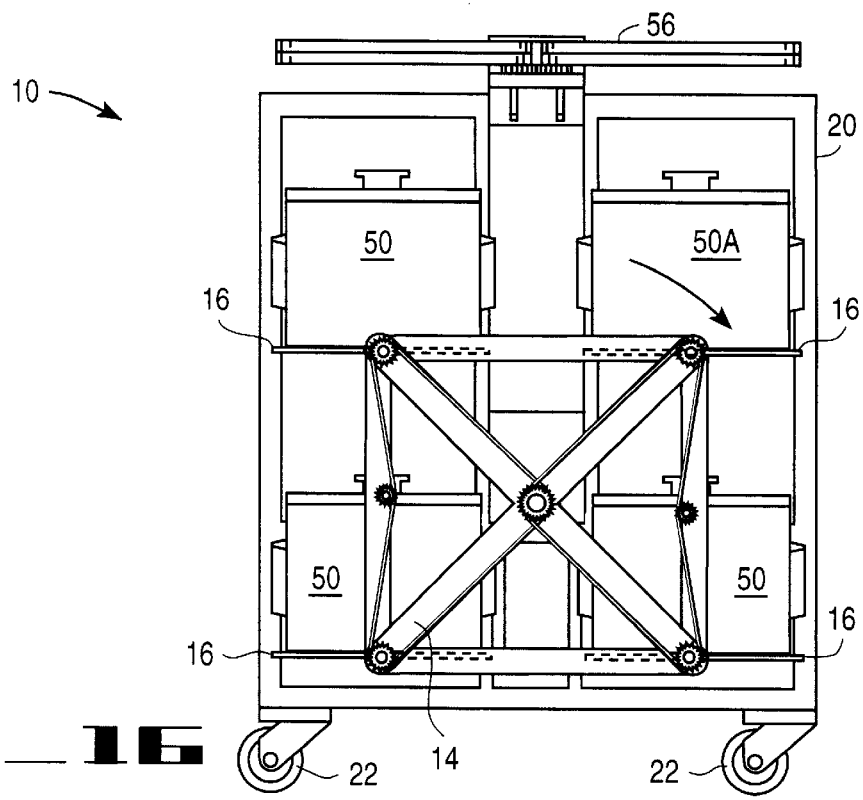
FIG_16
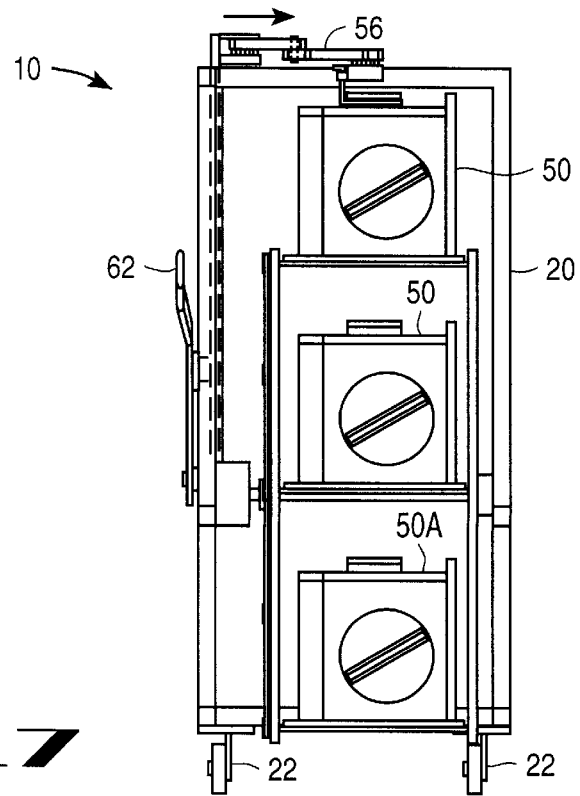
FIG_17

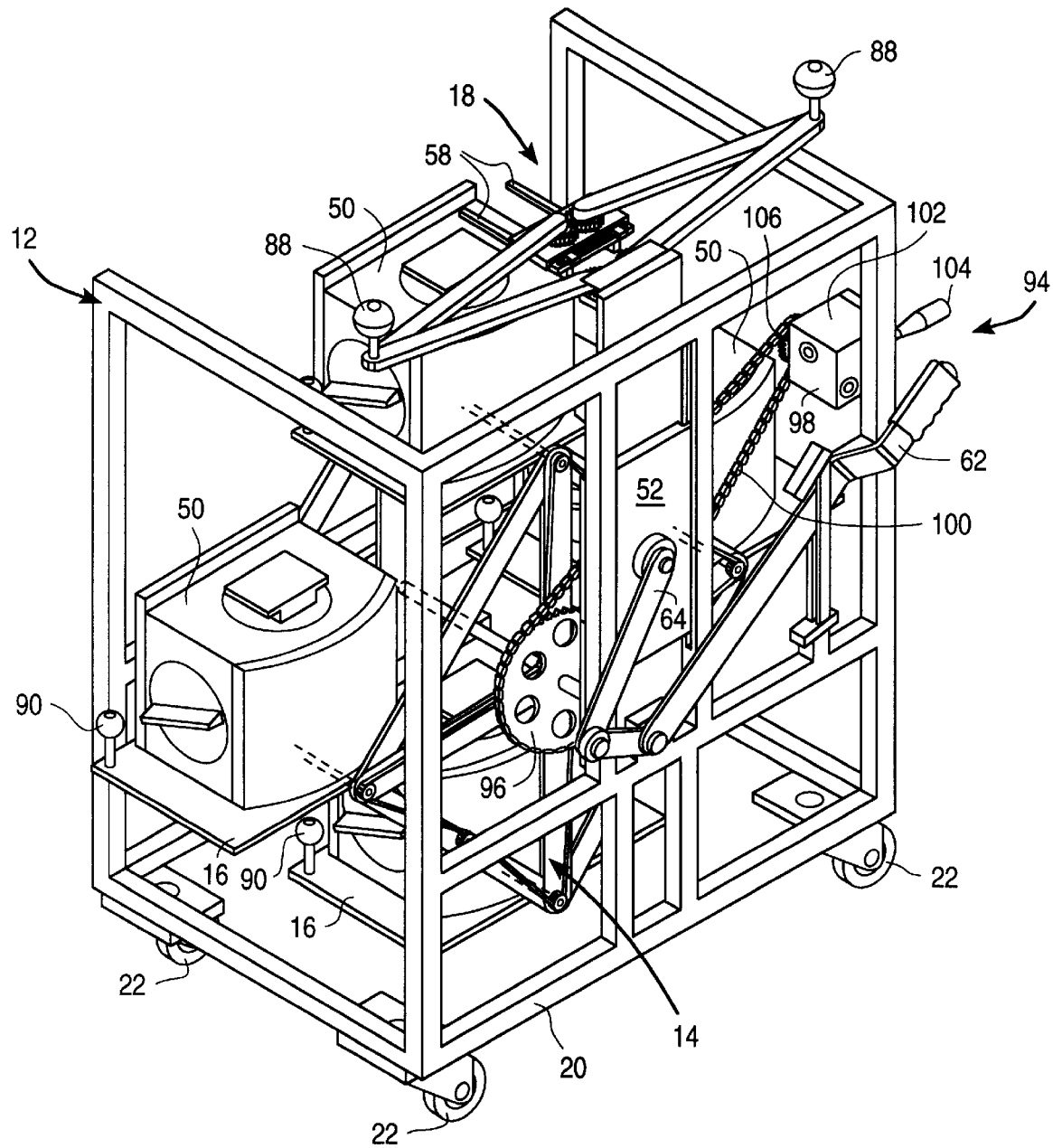
FIG_18

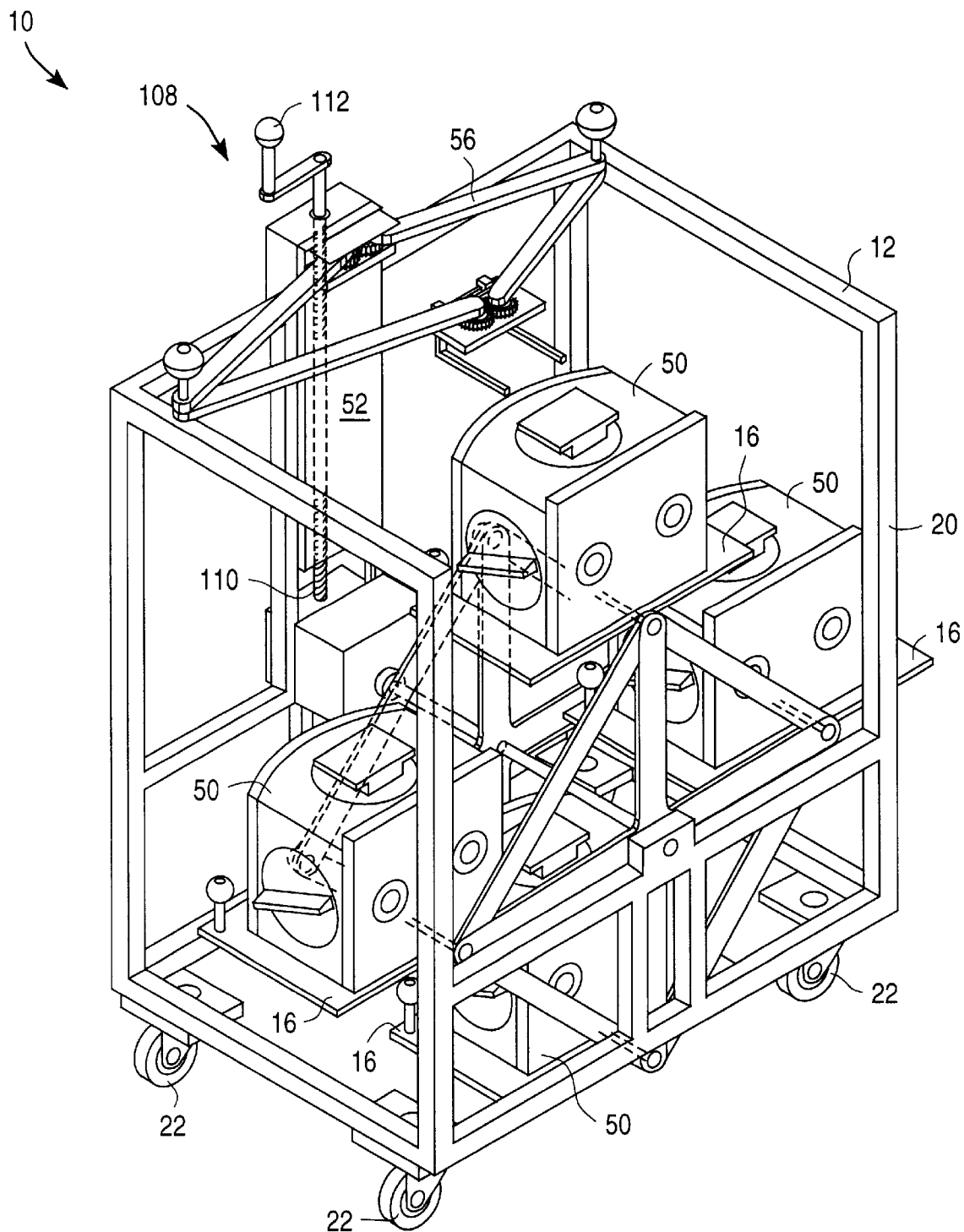
FIG_19

CART FOR TRANSFERRING OBJECTS

BACKGROUND OF THE INVENTION

1). Field of the Invention

This invention relates to a cart which is used for transferring holders.

2). Discussion of Related Art

It is often necessary to transfer materials or objects from location to location in a fabrication environment. A fabrication environment usually has a floor with passages painted or otherwise defined thereon. Various fabrication equipment may be located next to the passages. Stands are often located near or adjacent the fabrication equipment.

The materials or objects are usually located in holders which are located on a cart and transported to or from the fabrication equipment with the cart. Once the cart is positioned next to a stand one or more holders can be transferred between the cart and the stand.

It is often necessary to locate two or more holders on the cart. The cart may have a shelf for locating the holders on. The size of the shelf is determined by the sizes and number of holders to be transported. A relatively large shelf would be required in order to transport a large number of holders, especially if the holders themselves are relatively large. Such a large shelf necessitates a large cart which would be difficult to maneuver through the passages on the floor of the fabrication environment.

What is therefore required is a cart which allows for a relatively large number of relatively large holders to be transported in a relatively compact manner.

What may also be required is a cart which allows for easy transportation and transfer of the holders.

SUMMARY OF THE INVENTION

A cart for transferring objects includes a wheeled support structure, a carousel and at least first and second object supports. The carousel is rotatably mounted to the support structure. The object supports are mounted to the carousel. The respective object supports are located so as each to support a separate respective object at a separate respective location on a revolution of a carousel.

BRIEF DESCRIPTION OF THE DRAWINGS

The invention is further described by way of examples with reference to the accompanying drawings wherein:

FIG. 1 is a perspective view from the rear of a cart according to the invention;

FIG. 2 is a perspective view from the front of the cart;

FIG. 3 is a side view of a gearbox and forks forming part of the cart;

FIG. 4 is a rear view of the cart with a carousel of the cart rotated to allow for a holder to be moved onto the cart;

FIG. 5 is a side view of the cart when moved against a stand on which a holder is located;

FIG. 6 is a view similar to FIG. 5 wherein an arm of the cart is elevated;

FIG. 7 is a view similar to FIG. 6 wherein the arm is extended;

FIG. 8 is a view of an end of the arm which is lowered;

FIG. 9 is a view similar to FIG. 8 wherein the arm is further lowered until the forks engage the holder;

FIG. 10 is a view similar to FIG. 9 wherein the arm is further extended;

FIG. 11 is a view similar to FIG. 10 wherein the arm is again elevated;

FIG. 12 is a view similar to FIG. 11 wherein the arm is further elevated;

FIG. 13 is a side view of the cart wherein the arm is retracted until the holder is located over the cart;

FIG. 14 is a view similar to FIG. 13 wherein the arm is lowered until the holder is located on the cart;

FIG. 15 is a view similar to FIG. 14 wherein the arm is fully retracted;

FIG. 16 is a rear view of the cart illustrating rotation of the carousel;

FIG. 17 is a side view of the cart wherein the arm is extended to engage with a holder on the cart;

FIG. 18 is a perspective view similar to FIG. 1 with apparatus for rotating the carousel; and FIG. 19 is a perspective view similar to FIG. 2 having a screw-type arrangement for elevating and lowering the arm.

DETAILED DESCRIPTION OF THE INVENTION

A cart for transferring objects such as holders and a method of loading an object such as a holder onto and from a cart are described. In the following description, for purposes of explanation, numerous specific details are set forth in order to provide a thorough understanding of the present invention. It will be evident, however, to one skilled in the art, that the present invention may be practiced without these specific details.

A cart for transferring objects such as holders is described. The holders are located and moved in a carousel manner on the cart. By locating and rotating the holders in a carousel manner a large number of holders can be transported in a relatively compact manner. The holders can also be moved onto or from the cart in a relatively efficient manner. Although the following description is primarily directed at the transport and movement of holders, it should be understood that the invention may also find application in the transportation and movement of other objects.

FIGS. 1 and 2 are perspective views from the rear and front respectively of a cart 10 according to the invention. The cart 10 includes a wheeled support structure 12, a carousel 14 rotatably mounted to the support structure 12, four holder supports 16 mounted to the carousel 14, and holder transfer apparatus 18 amounted to the support structure 12.

The support structure 12 includes a steel frame 20 and castors 22 mounted to the frame 20.

The frame 20 includes lower horizontal sections 24, vertical corner sections 26 and upper horizontal sections 28.

The lower horizontal sections 24 are secured to one another in the form of a horizontal rectangle.

The vertical corner sections 26 are secured to and extend upwardly from corners of the horizontal rectangle defined by the lower horizontal sections 24.

The upper horizontal sections 28 are secured to upper ends of the vertical corner sections 26 in the form of a "U" with a side which is open to the front of the cart 10.

A rear horizontal supporting section 30 is secured between two of the vertical corner sections 26 on the rear of the cart 10. A front horizontal supporting section 32 is secured between two of the vertical corner sections on the front of the cart 10. Strengthening members 34 are secured between the lower horizontal sections 24 and the horizontal supporting sections 30 and 32.

The castors 22 are mounted to four corners of the horizontal rectangle defined by the lower horizontal sections 24. The castors 22 swivel to allow for maneuverability of the support structure 12.

A horizontal central pin 36 is mounted between the front and the rear horizontal supporting sections 30 and 32. The central pin 36 is non-rotational relative to the frame 20.

The carousel 14 includes a rear support square 38A and front support square 38B which are rotatably mounted to the central pin 36, and support pins 40.

Each support square 38A or 38B includes a cross 42 with a center point through which the central pin 36 extends, and strengthening sections 44 linking ends of the cross 42.

Each support pin 40 is secured between a respective end of the cross 42 of the rear support square 38A and a respective end of the cross 42 of the front support square 38B.

Each of the holder supports 16 comprises a steel shelf which is welded to a respective support pin 40.

A sun gear 46 is secured to the central pin 36 at the rear of the cart 10 and is non-rotational relative to the central pin 36.

A respective planetary gear 48 is secured to each of the support pins 40 at the rear of the cart 10.

Rotation of the crosses 42 on the central pin 36 allows for rotation of the carousel 14 relative to the frame 20. Chains 49 run over the non-rotating sun gear 46 and over the planetary gears 48. The planetary gears 48 are so maintained non-rotational about their respective axes relative to the sun gear 46 upon rotation of the carousel 14. Since the planetary gears 48 are secured to the support pins 40 and the holder supports 16 are welded to the support pins 40, the holder supports 16 are also maintained non-rotational, about their axes, relative to the sun gear 46 upon rotation of the carousel 14. Each respective planetary gear 48 is maintained non-rotational about its axes even though the respective planetary gear 48 revolves about the sun gear 46. The respective holder supports 16 are located so as each to support a separate respective object such as a holder 50 at a separate respective location on a revolution of the carousel. Furthermore, by maintaining the holder supports 16 non-rotational relative to the sun gear 46, a respective holder 50 can thus be supported by each holder support 16 during rotation of the carousel 14 without the holder support 16 tilting and causing the holder 50 to fall off the holder support 16.

The holder transfer apparatus 18 includes a vertical slide 52, a lever mechanism 54 for moving the slide 52 up and down, a horizontally extensible arm 56 mounted to the slide, and two forks 58 mounted to a movable end of the arm 56.

Two vertical slide support sections 60 are mounted at spaced locations between the rear horizontal supporting section 30 and an upper horizontal section 28. The slide 52 is mounted between the slide support sections 60 for vertical sliding movement.

The lever mechanism 54 includes a lever 62 which is pivotally secured at the rear of the cart 10 to the central pin 36, and a link section 64.

The lever 62 includes first and second sections 66 and 68 on opposing sides of the central pin 36.

The first section 66 extends from the frame 20 on a side of the frame 20 which follows the direction of travel of the cart 10 and terminates in a handle 69.

The link section 64 has a first end which is pivotally secured to an end of the second section 68, and a second end which is pivotally secured to the slide 52.

Up and down movement of the handle 69 causes pivoting of the lever 62. Pivoting of the lever 62 results in up and down movement of the slide 52. The first section 66 is longer than the second section 68 so as to increase the moment about the central pin 36.

The arm 56 includes first and second sections 70 and 72 which are pivotally secured to the slide 52, a third section 74 which is pivotally secured to an end of the fist section 70, and a fourth section 76 which is pivotally secured to an end of the second section 72. Terminating ends of the third and fourth sections 74 and 76 are secured to a gearbox 78.

A first set of gears 80 is secured between the first and second sections 70 and 72. The first set of gears 80 is in mesh so that the first and second sections 70 and 72 pivot together in opposite directions relative to the slide 52.

A second set of gears 82 is secured between terminating ends of the third and fourth sections 74 and 76. The second set of gears 82 is in mesh so that the third and fourth sections 74 and 76 pivot together in opposite directions relative to the gearbox 78.

FIG. 3 is a side view of the gearbox 78 and the forks 58. A slide bearing 84 is secured to the gearbox 78. Each fork 58 has a vertical portion 86 extending through the slide bearing 84, a horizontal portion 87 extending from an upper end of the vertical portion 86 and resting on the slide bearing 84, and a vertical holder engaging portion 89 extending from a lower end of the vertical portion 86.

The fork 58 is vertically movable relative to the gearbox 78 due to sliding movement of the vertical portion 86 within the slide bearing 84.

Referring again to FIGS. 1 and 2, horizontal motion handles 88 are mounted on the first and second sections 70 and 72 of the arm 56. Movement of the horizontal motion handles 88 causes extension or retraction of the arm 58.

A respective carousel rotation handle 90 is mounted on each opposing side of each of the holder supports 16. Each rotation handle 90 is located on the same side of a respective holder support 16 as the handle 69 of the lever 62. The rotation handles 90 can be used for rotating the carousel 14.

In use, holders 50 may be located on some of the holder supports 16. One or more of the holder supports 16 may be without holders.

The carousel 14 is then rotated, using the rotation handles 90, until an empty holder support 16 reaches the top, as shown in FIG. 4. The holder supports 16 carrying holders 50 are then located in lower storage positions.

The cart 10 is then moved, as shown in FIG. 5, against a stand carrying another holder 50A which has to be loaded onto the cart 10.

The arm 56 is then elevated by lowering the lever 62, as shown in FIG. 6.

The arm 56 is then extended by moving the horizontal motion handles 88, as shown in FIG. 7.

By lifting the lever 62, the arm 56 can be lowered as shown in FIG. 8.

Further lowering, as shown in FIG. 9, of the arm 56 results in the forks 58 contacting the holder 50A. The forks 58 move within the slide bearing 84. Damage to the holder 50A due to the weight of the arm 56 and the gearbox 78 is prevented by vertical movement of the forks 58 relative to the arm 56.

The arm 56 is then further extended until the forks 58 engage with complementary formations on the holder 50A, as shown in FIG. 10.

The lever 62 is then pushed down so that the arm 56 is again elevated, as shown in FIG. 11, until the horizontal portions 87 of the forks 58 rest on the slide bearing 84. Further elevation of the arm 56, as shown in FIGS. 12, lifts the holder 50A off the stand.

The arm 56 is then retracted from the stand until the holder 50A is located over the holder support 16 at the top, as shown in FIG. 13.

Lowering of the arm 56 positions the holder 50A on the holder support 16 at the top, as shown in FIG. 14.

The arm 56 is then further retracted to disengage the forks 58 with complementary formations on the holder 50A, as shown in FIG. 15.

The carousel 14 can then again be rotated as shown in FIG. 16. Rotation of the carousel 14 moves the holder 50A down into a storage position, and one of the other holders 50 to the top. The arm 56 can then again be extended until the forks 58 engage with the holder 50 then at the top, as shown in FIG. 17.

The arm can then be elevated, extended and lowered to transfer the holder 50 at the top to the stand next to the cart 10.

A compact arrangement is provided by storing, moving and transferring the holders 50 in a carousel manner. A relatively large number of holders 50 can thus be located on the cart 10 and transported in relatively compact form.

Holders can be transferred to and from the cart 10 by merely operating the holder transfer apparatus 18 and rotating the carousel 14. A holder next to the cart 10 can therefore be replaced by another holder without the need for moving the cart 10 forward or backward.

The cart 10 is proportioned to move lengthwise down a passage with a restricted width. An operator may position himself in the passage either in front or behind the cart 10 in its direction of travel. From the same position the operator may have access to the handle 69 on the lever 62, the rotation handles 90 on the holder supports 16, and one of the horizontal motion handles 88 on the arm 56.

In certain instances the holders 50 may be located in an unbalanced manner on the carousel 14. The carousel 14 may be difficult to rotate if a large imbalance exists. FIG. 18 illustrates the cart 10 of FIG. 1 which includes apparatus 94 for rotating the carousel 14.

The apparatus 94 includes a sprocket 96 which is secured to the carousel 14, a worm drive 98 and a chain 100.

The worm drive 98 includes a housing 102 which is secured to the frame 20, a winder 104 and a small gear 106. A worm gear (not shown) is located in the housing 102. Rotation of the winder 104 rotates the worm gear. The worm gear in turn rotates the small gear 106. A rotation ratio of about 15:1 may exist between the winder 104 and the small gear 106.

The chain 100 runs over the small gear 106 and the sprocket 96. The sprocket 96 may be about 5 times as large as the small gear 106 so that a rotation ratio of about 5:1 may exist between the small gear 106 and the sprocket 96.

Rotation of the winder 104 therefore causes rotation of the sprocket 96 at a rate of 75 turns of the winder 104 to one turn of the sprocket 96, with a corresponding increase in torque. The winder 104 can thus be used for rotating the carousel 14 even though the holder supports 16 are not evenly loaded. The operator may also then release the winder 104 without causing the carousel 14 to turn.

The lever mechanism 54 may be replaced with any other device. In FIG. 19, for example, the lever mechanism 54 of the cart 10 of FIGS. 1 and 2 is replaced with a screw-type arrangement 108.

The arrangement 108 includes a vertical screw 110 which is in threaded engagement with the slide 52, and a crank 112 for rotating the screw 110. The screw 110 rests on the rear horizontal supporting section 30. Rotation of the screw 110 causes vertical movement of the slide 52 with a corresponding change in elevation of the arm 56. Once the arm 56 is elevated, an operator can release the crank 112 without dropping the arm 56.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. A cart for transferring objects, including:
    a wheeled support structure;
    a carousel rotatably mounted to the support structure;
    at least first and second object supports mounted to the carousel, the respective object supports being located so as each to support a separate respective object at a separate respective location on a revolution of the carousel; and
    an apparatus which maintains the object supports non-rotational, the apparatus including a sun disc mounted non-rotationally to the support structure, and a respective planetary disc, each respective planetary disc mounted to a respective object support, and being maintained non-rotationally by the sun disc.

2. The cart of claim 1 wherein the carousel rotates about an axis which is substantially horizontal.

3. The cart of claim 1 wherein the discs are gears.

4. The cart of claim 1 which includes at least one flexible member which links the discs so as to maintain planetary discs non-rotational.

5. The cart of claim 4 wherein the flexible member is a chain.

6. The cart of claim 1 which includes an object transfer apparatus operable to move an object between a position on one of the object supports and a position next to the support structure.

7. The cart of claim 6 wherein the object transfer apparatus includes an extensible arm and an object engager at a movable end of the arm.

8. The cart of claim 7 wherein the object engager is vertically movable relative to the arm.

9. The cart of claim 7 wherein the object transfer apparatus includes an elevating device operable to change the elevation of the arm.

10. The cart of claim 9 wherein the elevating device includes a lever extending from the support structure.

11. The cart of claim 10 wherein the lever is located on a side of the support structure in its direction of travel.

12. The cart of claim 7 wherein the object transfer apparatus includes a screw.

13. The cart of claim 1 which includes apparatus which is operable to rotate the carousel.

14. A cart for transferring objects, including:
    a wheeled support structure;
    a carousel which is mounted to the support structure for rotation about a substantially horizontal axis;
    at least first and second object supports, mounted to the carousel, which remain substantially non-rotational upon rotation of the carousel, the respective object supports being located so as each to support a separate respective object at a separate respective location on a revolution of the carousel;

an extensible arm which is mounted to the support structure;

an object engager on a moving end of the arm, wherein an object, when engaged with the object engager, is movable by the arm between a position over one of the object supports and a position next to the support structure;

a slide which is operable to change the elevation of the arm; and a lever mounted to the support structure which is operable to vertically move the slide.

15. A method of loading an object from a cart, including a wheeled support structure, a carousel rotatably mounted to the support structure, and an object support to support the object upon a revolution of the carousel, the method comprising:

rotating the carousel relative to the support structure so that the object is moved from a storing position into a loading position, thereby maintaining the object non-rotational by use of a sun disc mounted non-rotationally to the support structure, and a planetary disc, mounted to the object support, which is maintained non-rotational by the sun disc; and moving the object from the cart.

16. A cart for transferring objects, including:

a wheeled support structure;

a carousel rotatably mounted to the support structure;

at least first and second object supports mounted to the carousel, the respective object supports being located so as each to support a separate respective object at a separate respective location on a revolution of the carousel;

a object transfer apparatus operable to move an object between a position on one of the object supports and a position next to the support structure, wherein the object transfer apparatus includes an extensible arm, an object engager at a movable end of the arm, and an elevating device operable to change the elevation of the arm, wherein the elevating device includes a lever extending from the su port structure.

17. A cart for transferring objects, including:

a wheeled support structure;

a carousel rotatably mounted to the support structure;

at least first and second object supports mounted to the carousel, the respective object supports being located so as each to support a separate respective object at a separate respective location on a revolution of the carousel;

an object engager; and a lever having a handle, which is mounted to the support structure and secured to the object engager, whereby the lever is operable so that the object engager is elevated with respect to the cart.

* * * * *